United States Patent [19]
Zukausky

[11] Patent Number: 4,457,343
[45] Date of Patent: Jul. 3, 1984

[54] FLOW WASHER
[75] Inventor: Keith E. Zukausky, Hanover, Ill.
[73] Assignee: Eaton Corporation, Cleveland, Ohio
[21] Appl. No.: 419,891
[22] Filed: Sep. 20, 1982
[51] Int. Cl.³ .............................................. F15D 1/02
[52] U.S. Cl. .................................. 138/45; 239/533.14
[58] Field of Search ....................... 138/40, 44, 45, 46;
239/533.13, 533.14, 542, DIG. 18; 137/8;
411/531, 544, 545

[56] References Cited
U.S. PATENT DOCUMENTS

| | | | |
|---|---|---|---|
| 2,515,073 | 7/1950 | Binnall et al. | 138/45 |
| 2,775,984 | 1/1957 | Dahl | 138/45 |
| 2,910,093 | 10/1959 | Dahl | 138/46 |
| 2,989,086 | 6/1961 | Dahl | 138/43 |
| 3,006,378 | 10/1961 | Erickson et al. | 138/46 |
| 3,444,897 | 5/1969 | Erickson | 138/45 |
| 3,779,468 | 12/1973 | Spencer | 138/45 X |
| 4,105,050 | 8/1978 | Hendrickson et al. | 138/45 |
| 4,193,545 | 3/1980 | Havens | 138/45 X |

Primary Examiner—James E. Bryant, III
Attorney, Agent, or Firm—C. H. Grace; R. A. Johnston

[57] ABSTRACT

A flow control employing elastically deformable washer received in a cavity having a single contoured flow orifice having a plurality of inwardly extending projections formed on the periphery of the orifice. At inlet pressures at and below a predetermined threshold, the projections form the periphery of the single orifice and at pressures above threshold the washer is deformed in the cavity and the projections come into mutual contact thereby forming a plurality of smaller elongated orifices instead of a single large orifice. The elongated plural orifices tend to minimize velocity increases caused by increased pressure.

10 Claims, 4 Drawing Figures

FLOW WASHER

BACKGROUND OF THE INVENTION

The present invention relates to flow control devices employed for regulating the volumetric flow of fluid in a conduit over a range of variable supply line pressures. The present invention relates in particular to devices for controlling the flow of fluid supplied to appliances such as household washing machines and dishwashers. Household appliances of this type commonly employ an electrically actuated water inlet valve for controlling the amount of fluid admitted to the appliance during the operating cycle when the appliance is connected to the household water supply line. Typically, the amount of fluid admitted to the appliance is determined by opening the inlet valve for a timed interval. If the flow rate is known and is substantially constant, the amount of fluid admitted or water fill is determined by permitting the known flow rate for predetermined interval.

Thus, it is important when the aforementioned technique is employed for controlling water fill in household appliances, to maintain a known or constant rate of inlet flow over the interval of time during which the electrically controlled inlet valve is maintained in the open position. Since the supply line pressure to a household may vary over a broad range of pressures determined by the particular water supply system available at the location of the household, the inlet valve must, of necessity, have some means of maintaining the flow rate at a nearly constant value over the range of supply line pressure encountered in actual service conditions. It has thus been the practice of manufacturers of household washing appliances to include a flow control device at the appliance water inlet. In particular, it is known to provide a resilient, deformable flow control washer at the inlet of the electrically actuated fill valve.

The resilient flow control washer is typically received in a cavity conformed to closely fit the flow washer. Upon experiencing increased line pressures at its upstream face, the flow washer is deformed elastically by the action of the pressure against flow washer and the reaction of the cavity wall. The elastic deformation of the flow washer upon experiencing increased pressure characteristically reduces the size of the flow orifice through the washer, and thereby maintains the flow rate constant through a reduced size flow orifice.

Where resilient flow control washers are employed having a single central flow orifice or a plurality of circumferentially spaced flow orifices, it has been found that at higher inlet pressures, and consequently greatly reduced size orifices, cavitation and noise are encountered as the higher velocity flow passes through the orifice. Thus, it has long been desired to provide a resilient elastically deformable flow control washer which provides the desired flow control over a broad range of inlet pressures and yet does not experience cavitation or noise at higher pressures.

SUMMARY OF THE INVENTION

The present invention provides a solution to the above described problem by employing a unique elastomeric flow control washer in a cavity formed in a fluid passage or conduit. The cavity is sized and configured to closely fit the flow control washer. Upon the washer experiencing fluid inlet pressure at or above a predetermined threshold level, the washer is compressed against the cavity wall and deformed in such a manner that the single flow orifice provided therethrough becomes a plurality of smaller elongated orifices instead of a single orifice.

The flow control washer employed in the present invention employs a plurality of projections or ribs extending inwardly from the periphery of the single orifice. Upon the washer experiencing inlet pressures at or below the predetermined threshold level, the washer is substantially undeformed such that the projections or ribs provide a contracurvature for the periphery of the single flow control orifice. This arrangement increases the circumference or periphery to area ratio of the orifice and thereby reduces the flow velocity therethrough below threshold pressures. Upon the washer experiencing pressures above the predetermined threshold, the projections are moved inwardly to a position of mutual contact whereby the single orifice becomes a plurality of smaller elongated orifices. The elongated orifices thus increase the periphery to area ratio of the flow control orifices at the above threshold pressures and thereby reduce the flow velocity at such above-threshold pressures.

The present invention thus provides a unique flow control having a resilient, elastically deformable washer which has a single orifice therethrough having a high periphery to area ratio at below threshold pressures and which deforms to form a plurality of smaller elongated orifices having a high periphery to area ratio at above threshold pressures for minimizing cavitation and noise associated with attendant higher flow velocities.

DETAILED DESCRIPTION

Figure 1:
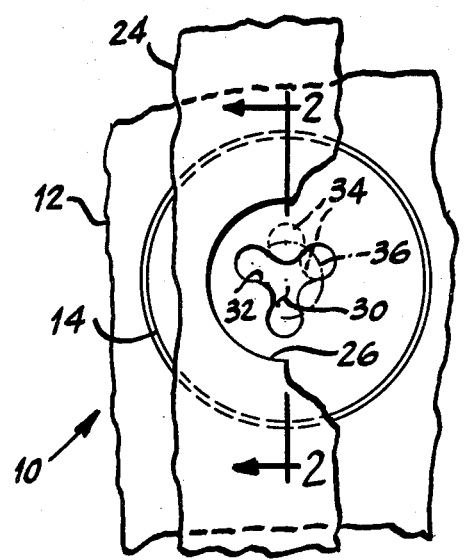
FIG. 1 is an inlet end view of a conduit employing the flow control of the present invention illustrated at inlet pressures below the threshold.
Figure 2:
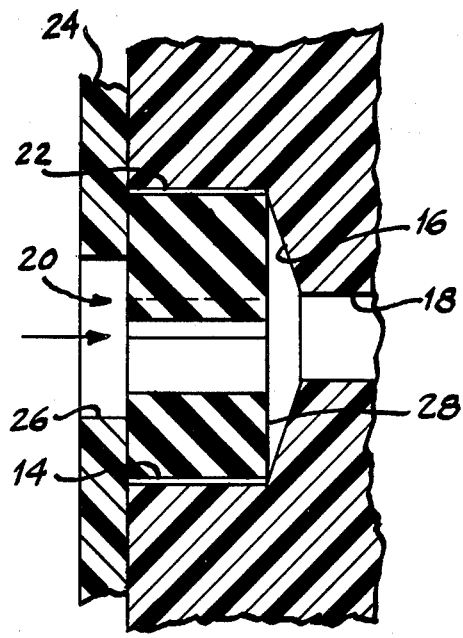
FIG. 2 is a section view taken along section-indicating lines 2—2 of FIG. 1.

Referring now to FIGS. 1 and 2, the flow control, indicated generally at 10, has a body or housing 12 with a cavity 14 formed therein. The cavity has the downstream end or face 16 thereof beveled or chamfered and has an outlet 18 formed centrally therethrough. A flow control washer indicated generally at 20 is received in the cavity in closely spaced interfitting relationship about the outer periphery 22 thereof.

A cover plate or retainer 24 is provided and is secured to the housing 12 by any suitable means, as for example, weldment or fasteners (not shown). The plate 24 has a suitable inlet 26 provided therein which is adapted to receive fluid flow from a pressurized source such as a household waterline upon connection thereto.

The downstream face 28 of the flow washer is configured so as to be spaced from the end face 16 of the cavity in the unpressurized condition as illustrated in FIG. 2. Although the washer is illustrated in FIG. 2 in one embodiment as having a generally planar face 28 and the housing cavity end 16 beveled, it will be understood that an alternate embodiment (not shown) may be employed in which the face 28 of the washer may be beveled, or formed in concavity, and the end face 16 of the body cavity formed in generally planar configuration.

The flow washer 20 has a single central orifice 30 formed therein having the outer periphery thereof including a plurality of inwardly extending projections or ribs 32 formed thereon. The projections 32 give the periphery of the orifice 30 a reverse or contracurvature.

The projections 32, in the presently preferred practice, are configured by inscribing adjacent circles, indicated by the dashed lines at 34, having their centers located on a common "circle-of-centers" circle 36 in circumferentially spaced arrangement thereabout with adjacent circles 34 in contact at the point of intersection of the circle-of-centers 36. The adjacent circles 34 will thus provide circular grooves between the projections 32 as shown in FIG. 1. In the presently preferred practice of the invention, three ribs 32 are provided in circumferentially equally spaced arrangement with the circles forming the ribs comprising three of six circles inscribed on the circle-of-centers 36. The inscribed circles 34 preferably have a radius on the order of one-half of the radius of the circle of centers.

Figure 3:
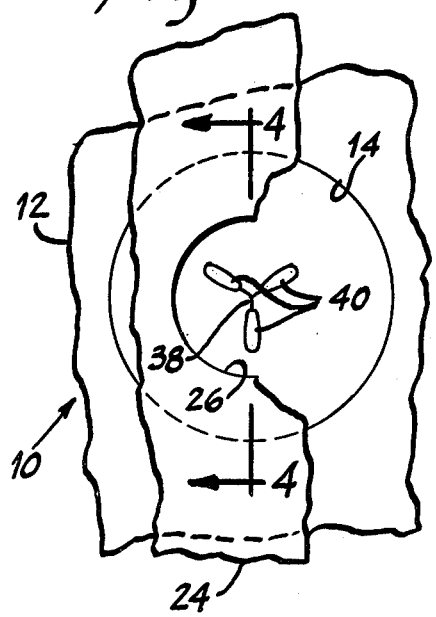
FIG. 3 is a view similar to FIG. 1 illustrating the flow control at inlet pressures above the threshold; and, FIG. 4 is a section view taken along section-indicating lines 4—4 of FIG. 3.
Figure 4:
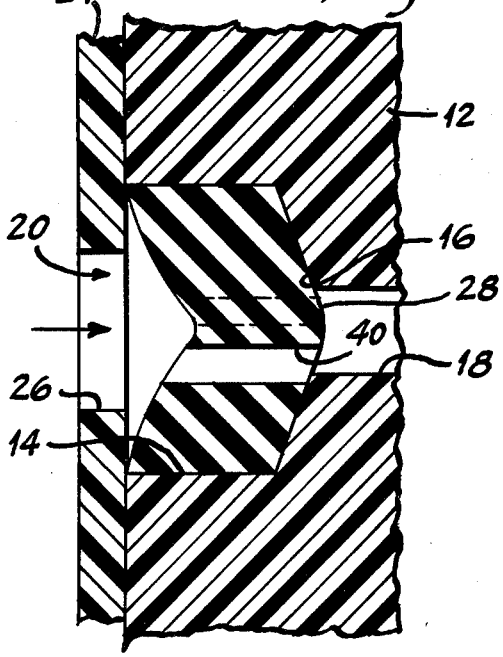

The area of the undeformed orifice 30 is chosen to give the desired flow rate at the threshold pressure. Referring now to FIGS. 3 and 4, the flow control is shown in the deformed configuration as exposed to higher inlet fluid pressures above a predetermined threshold. The flow washer is deformed at the threshold pressure to the configuration shown in FIGS. 3 and 4 and is supported at above threshold pressures by the end face 16 and other periphery 14 of the housing cavity. As increasingly higher pressures above the threshold increasingly deform the flow washer, the projections 32 (see FIG. 1) are deformed inwardly to mutual contact along the lines 38 shown in FIG. 3 in the form of a "Y". At above-threshold pressures, the remaining portions of the periphery of the aperture 30 are distorted to form a plurality of apertures 40 having their crosssection elongated in the radial direction. The plural apertures 40 also have a high ratio of periphery to cross-sectional area and thus maximize the effects of their peripheral surface in minimizing the velocity of the flow therethrough. The elongated apertures 40 of the present invention thus tend to reduce the flow velocity increases caused by the reduction in size of the flow area due to compression and deformation of the flow washer.

The washer 20 of the present invention thus provides at pressures both above and below the deformation threshold a flow passage having a high ratio of peripheral surface area to crosssectional area. It has been found satisfactory to form the flow washer 20 of the present invention of elastomeric material having a hardness in the range of 40-90 durometer as measured on the Shore "A" scale. In the presently preferred practice, the flow washer material is chosen to have a hardness in the range of 65-90 Shore "A" durometer.

The embodiment described hereinabove has been shown in the presently preferred form as having three projections 32 for forming three small flow apertures at above threshold pressures; however, it will be understood that two, or more than three, projections may be employed for providing the desired velocity retarding effects.

The present invention thus provides a unique flow control of the type employing an elastically deformable washer wherein the washer at below threshold pressures has a single flow aperture having a plurality of projections extending from the periphery thereof which projections are deformed to mutual central contact at above threshold pressures to thereby provide a plurality of flow apertures having elongated flow sections. The present invention thus provides a unique flow control employing an elastically deformable flow washer which provides a flow passage having a high peripheral surface area to flow area ratio for retarding velocity increases caused by increasing pressure at the inlet.

Although the present invention has hereinabove been described with respect to the presently preferred embodiment, it will, however, be understood by those having ordinary skill in the art that the invention is capable of modifications and variations and is limited only by the following claims:

I claim:
1. A flow control comprising:
   (a) conduit means defining a fluid passage having an inlet and outlet, and including structure defining a cavity having an annular support surface diposed about the outlet;
   (b) a resilient flow washer formed of elastomeric material received in said cavity in closely fitting relationship thereto; said flow washer having,
      (i) opposite faces with one face thereof disposed toward said outlet and initially spaced from said support surface,
      (ii) an aperture formed therethrough between the opposite faces thereof, said aperture configured to have a plurality of inward projections disposed about the periphery thereof in generally equally spaced arrangement, said projections configured to define therebetween at inlet pressures below a threshold level a plurality of radially outer cavities each communicating with said central aperture through a restricted throat region such that upon said washer opposite face experiencing inlet fluid pressure at or below the threshold level, said washer is substantially undeformed and said central aperture is maintained, and upon said opposite face experiencing increasing inlet fluid pressures reaching said threshold level the washer is deformed such that said one face contacts said support surface and upon further increased fluid pressure said projections come together at the ends thereof in mutual contact to close said central aperture and form each of said outer cavities into an aperture to create a plurality of flow apertures disposed circumferentially about said washer.
2. The flow control as defined in claim 1, wherein said downstream face of said washer has a substantially planar configuration and said support surface includes a chamferred portion adjacent said outlet.
3. The flow control as defined in claim 1, wherein said washer is formed of elastomeric material having a hardness in the range 40-90 durometer as measured on the Shore "A" scale.
4. The flow control as defined in claim 1, wherein said washer is formed of elastomeric material having a hardness in the range 65-90 durometer as measured on the Shore "A" scale.
5. The flow control defined in claim 1, wherein said flow washer projections are configured such that said plurality of apertures have an elongated cross-sectional shape.
6. A flow control member characterized in that said member is formed of elastomeric material and has oppo- sitely disposed faces with an aperture formed therethrough between said faces, said aperture having a plurality of projections spaced generally equally about the periphery of said aperture, said projections extending inwardly therefrom and configured to define therebetween a plurality of radially outer cavities each communicating with said central aperture through a restricted channel region whereupon said member being received in a supporting cavity and upon one face thereof experiencing fluid pressures at and below a threshold level, said washer is deformed to cause the face opposite said one face to contact a surface of said cavity and said restricted projections are disposed to form a single central aperture in said washer and upon said one face experiencing increased fluid pressures above said threshold level said the radially inward portions of said projections elastically deform and come together in mutual contact at the ends thereof to close said central aperture, said restricted channels thereby forming said outer cavities into a plurality of circumferentially spaced apertures disposed radially outwardly of the closed central region.

7. The flow washer defined in claim 6, wherein said projections comprise three circumferentially equally spaced tabs extending radially inwardly from the periphery of said single aperture, said tabs forming three circumferentially equally spaced apertures upon said washer upstream face experiencing fluid pressures above said predetermined level.

8. The flow washer defined in claim 6, wherein said elastomeric material has a hardness in the range 40–90 durometer as measured on the Shore "A" scale.

9. The flow washer defined in claim 6, wherein said elastomeric material has a hardness in the range 65–90 durometer as measured on the Shore "A" scale.

10. The flow washer defined in claim 6, wherein said projections are configured such that said plurality of apertures each has an elongated cross-sectional shape.

* * * * *